US007533069B2

(12) United States Patent
Fairweather

(10) Patent No.: US 7,533,069 B2
(45) Date of Patent: May 12, 2009

(54) SYSTEM AND METHOD FOR MINING DATA

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 0 days.

(21) Appl. No.: 11/455,304

(22) Filed: Jun. 16, 2006

(65) Prior Publication Data

US 2006/0235811 A1    Oct. 19, 2006

Related U.S. Application Data

(63) Continuation of application No. 10/357,290, filed on Feb. 3, 2003, now abandoned.

(60) Provisional application No. 60/353,487, filed on Feb. 1, 2002.

(51) Int. Cl.
*G06N 5/00* (2006.01)
(52) U.S. Cl. .......................................... 706/12; 706/45
(58) Field of Classification Search .................... 706/12, 706/45, 47; 704/9
See application file for complete search history.

(56) References Cited

U.S. PATENT DOCUMENTS

| | | | |
|---|---|---|---|
| 4,905,138 A | 2/1990 | Bourne | 717/139 |
| 5,105,353 A | 4/1992 | Charles et al. | 717/143 |
| 5,214,785 A | 5/1993 | Fairweather | 710/67 |
| 5,276,880 A | 1/1994 | Platoff et al. | 717/143 |
| 5,303,392 A | 4/1994 | Carney et al. | 717/153 |
| 5,339,406 A | 8/1994 | Carney et al. | 714/45 |
| 5,375,241 A | 12/1994 | Walsh | 719/331 |
| 5,410,701 A | 4/1995 | Gopalraman | 717/142 |
| 5,487,147 A | 1/1996 | Brisson | 714/1 |
| 5,586,329 A | 12/1996 | Knudsen et al. | 717/108 |
| 5,596,752 A | 1/1997 | Knudsen et al. | 717/117 |
| 5,677,835 A | 10/1997 | Carbonell et al. | 704/8 |
| 5,682,535 A | 10/1997 | Knudsen | 717/117 |
| 5,694,523 A | 12/1997 | Wical | 706/45 |
| 5,748,975 A | 5/1998 | Van De Vanter | 717/111 |
| 5,768,580 A | 6/1998 | Wical | 707/102 |
| 5,794,050 A | 8/1998 | Dahlgren et al. | 717/144 |
| 5,819,083 A | 10/1998 | Chen et al. | 707/10 |
| 5,870,608 A | 2/1999 | Gregory | 717/131 |
| 5,897,642 A | 4/1999 | Capossela et al. | 707/203 |
| 5,903,756 A | 5/1999 | Sankar | 717/131 |
| 5,915,255 A | 6/1999 | Schwartz et al. | 707/206 |
| 5,963,742 A | 10/1999 | Williams | 717/143 |
| 5,991,539 A | 11/1999 | Williams | 717/143 |
| 5,995,920 A | 11/1999 | Carbonell et al. | 704/9 |
| 6,061,675 A | 5/2000 | Wical | 706/45 |
| 6,076,088 A | 6/2000 | Paik et al. | 707/5 |
| 6,083,282 A | 7/2000 | Caron et al. | 717/101 |
| 6,094,650 A | 7/2000 | Stoffel et al. | 707/3 |
| 6,115,782 A | 9/2000 | Wolczko et al. | 711/100 |
| 6,139,201 A | 10/2000 | Carbonell et al. | 704/2 |
| 6,163,785 A | 12/2000 | Carbonell et al. | 715/530 |
| 6,182,281 B1 | 1/2001 | Nackman et al. | 717/116 |
| 6,199,034 B1 | 3/2001 | Wical | 704/9 |
| 6,219,830 B1 | 4/2001 | Eidt et al. | 717/139 |
| 6,237,005 B1 | 5/2001 | Griffin | 707/102 |
| 6,263,335 B1 | 7/2001 | Paik et al. | 707/5 |
| 6,289,338 B1 | 9/2001 | Stoffel et al. | 707/3 |
| 6,353,925 B1 | 3/2002 | Stata et al. | 717/112 |
| 6,366,933 B1 | 4/2002 | Ball et al. | 715/511 |
| 6,453,321 B1 | 9/2002 | Hill et al. | 707/103 Y |
| 6,487,545 B1 | 11/2002 | Wical | 706/45 |
| 6,507,833 B1 | 1/2003 | Hichwa et al. | 707/1 |
| 6,539,460 B2 | 3/2003 | Castelli et al. | 711/112 |
| 6,564,263 B1 | 5/2003 | Bergman et al. | 709/231 |
| 6,591,274 B1 | 7/2003 | Smith et al. | 707/104.1 |
| 6,640,231 B1 | 10/2003 | Andersen et al. | 707/102 |
| 6,654,953 B1 | 11/2003 | Beaumont et al. | 717/158 |
| 6,658,627 B1 | 12/2003 | Gallup et al. | 715/536 |
| 6,678,677 B2 | 1/2004 | Roux et al. | 707/3 |

(Continued)

OTHER PUBLICATIONS

Mitopia Global Information Intelligence Platform: Overview, MitoSystems, Inc., Santa Monica, Ca, Nov. 2003, pp. 1-4.*
Mitopia, The Definitive Intelligence Platform: Executive Overview, MitoSystems, Inc., Santa Monica, Ca, Mar. 2004, pp. 1-22.*
"Using the WFT Development Environment," Workflow Template Process Template, Template Software, 1998, Whole Manual.
Developing a WFT Workflow System, Workflow Template Process Template, Template Software, 1998, Whole Manual.
Mauny, et al., "Parsers in ML," 1992, ACM, p. 76-85.
Pai, et al., "Global Context Recovery: A New Strategy for Syntactic Error Recovery by Table-Driven Parsers," 1980, ACM, p. 18-41.

(Continued)

*Primary Examiner*—Wilbert L Starks, Jr.
(74) *Attorney, Agent, or Firm*—Stanley J. Gradisar

(57) ABSTRACT

A system and method for extracting data, hereinafter referred to as MitoMine, that produces a strongly-typed ontology defined collection referencing (and cross referencing) all extracted records. The input to the mining process can be any data source, such as a text file delimited into a set of possibly dissimilar records. MitoMine contains parser routines and post processing functions, known as 'munchers'. The parser routines can be accessed either via a batch mining process or as part of a running server process connected to a live source. Munchers can be registered on a per data-source basis in order to process the records produced, possibly writing them to an external database and/or a set of servers. The present invention also embeds an interpreted ontology based language within a compiler/interpreter (for the source format) such that the statements of the embedded language are executed as a result of the source compiler 'recognizing' a given construct within the source and extracting the corresponding source content. In this way, the execution of the statements in the embedded program will occur in a sequence that is dictated wholly by the source content. This system and method therefore make it possible to bulk extract free-form data from such sources as CD-ROMs, the web etc. and have the resultant structured data loaded into an ontology based system.

21 Claims, No Drawings

U.S. PATENT DOCUMENTS

| | | | | |
|---|---|---|---|---|
| 6,704,737 | B1 | 3/2004 | Nixon et al. | 707/101 |
| 6,721,723 | B1 | 4/2004 | Gibson et al. | 707/2 |
| 6,728,692 | B1 | 4/2004 | Martinka et al. | 706/45 |
| 6,748,481 | B1 | 6/2004 | Parry et al. | 711/100 |
| 6,748,585 | B2 | 6/2004 | Proebsting et al. | 717/136 |
| 6,826,744 | B1 | 11/2004 | McAuley | 717/108 |
| 6,847,979 | B2 | 1/2005 | Allemang et al. | 707/102 |
| 6,862,610 | B2 | 3/2005 | Shuster | 709/217 |
| 6,883,087 | B1 | 4/2005 | Raynaud-Richard et al. | 712/213 |
| 7,158,984 | B2 | 7/2005 | Lewis | |
| 6,950,793 | B2 | 9/2005 | Ross et al. | 704/9 |
| 7,003,764 | B2 | 2/2006 | Allison | 717/143 |
| 7,240,330 | B2 | 3/2006 | Ingberg | |
| 7,027,975 | B1 * | 4/2006 | Pazandak et al. | 704/9 |
| 7,062,760 | B2 | 6/2006 | Tonouchi | 71/143 |
| 7,210,130 | B2 | 6/2006 | Nahar | |
| 7,100,153 | B1 | 8/2006 | Ringseth et al. | 717/140 |
| 7,103,749 | B2 | 9/2006 | Fairweather | 711/208 |
| 7,111,283 | B2 | 9/2006 | Fraser et al. | 717/136 |
| 7,143,087 | B2 | 11/2006 | Fairweather | 707/3 |
| 2004/0044836 | A1 | 3/2004 | Wong et al. | 711/103 |

OTHER PUBLICATIONS

Anil Khatri, Office Action Summary, Jul. 3, 2006, U.S. Appl. No. 10/357,326, now Allowed.

Menier et al., "Lexical analyze based on self organizing feature map," IEEE, pp. 1067-1071, 1997.

Reps, "Maximal munch tokenization in linear," ACM Trans. Prog. Language and Systems, vol. 20, No. 2, pp. 259-273, 1998.

Takase et al., "An adaptive fast and safe XML parser based on byte sequences memorization," ACM WWW, pp. 692-701, 2005.

Hamlet et al., "Exploring dataflow testing of arrays", IEEE, pp. 118-129, 1993.

Anil Khatri, Notice of Allowance, Apr. 16, 2007, U.S. Appl. No. 10/357,326, now Allowed.

Kavita Padmanabhan, Office Action Summary, Nov. 28, 2005, U.S. Appl. No. 10/357,304, now Allowed.

Kavita Padmanabhan, Office Action Summary, Jun. 7, 2006, U.S. Appl. No. 10/357,304, now Allowed.

Kavita Padmanabhan, Advisory Action, Aug. 15, 2006, U.S. Appl. No. 10/357,304, now Allowed.

Kavita Padmanabhan, Office Action Summary, Nov. 27, 2006, U.S. Appl. No. 10/357,304, now Allowed.

Kavita Padmanabhan, Notice of Allowance, May 30, 2007, U.S. Appl. No. 10/357,304, now Allowed.

"The Vesta Repository: A File System Extension for Software Development," Sheng-Yang Chiu et al.; Jun. 14, 1993, Systems Research Center, CA, vol. 106.

Lindholm-Yellin, Verification of class Files, The Java Virtual Machine Specification, Addison-Wesley. Sep. 1996. http://java.sun.com/docs/books/jvms/second_edition/html/VMSpecTOC.doc.html.

Nodes and Arcs the Ideal Primitive Data Structures, E. Lowry, Digital Equipment Corporation (Nov. 1980).

C.J. Date, "An introduction to database systems", vol. 1, 4th Ed., Addison-Wesley Publishing Co., 1986, pp. 503-540.

* cited by examiner

SYSTEM AND METHOD FOR MINING DATA

CROSS REFERENCE TO RELATED APPLICATION

This application is a continuation of application Ser. No. 10/357,290 filed on Feb. 3, 2003 now abandoned, titled "A System And Method For Mining Data," which claims the benefit of U.S. Provisional Application Ser. No. 60/353,487 filed on Feb. 1, 2002, titled "Integrated Multimedia Intelligence Architecture," both of which are incorporated herein by reference in their entirety for all that is taught and disclosed therein.

BACKGROUND OF THE INVENTION

The data ingestion and conversion process is generally known as data mining, and the creation of robust systems to handle this problem is the subject of much research, and has spawned the creation of many specialized languages (e.g., Perl) intended to make this process easier. Unfortunately, while there have been some advances, the truth of the matter is that none of these 'mining' languages really provides anything more than a string manipulation library embedded into the language syntax itself. In other words, such languages are nothing more than shorthand for the equivalent operations written as a series of calls to a powerful subroutine library. A prerequisite for any complex data processing application, specifically a system capable of processing and analyzing disparate data sources, is a system that can convert the structured, semi-structured, and un-structured information sources into their equivalent representation in the target ontology, thereby unifying all sources and allowing cross-source analysis.

For example, in a current generation data-extraction script, the code involved in the extraction basically works its way through the text from beginning to end trying to recognize delimiting tokens and once having done so to extract any text within the delimiters and then assign it to the output data structure. When there is a one-to-one match between source data and target representation, this is a simple and effective strategy. As we widen the gap between the two, however, such as by introducing multiple inconsistent sources, increasing the complexity of the source, nesting information in the source to multiple levels, cross referencing arbitrarily to other items within the source, and distributing and interspersing the information necessary to determine an output item within a source, the situation rapidly becomes completely unmanageable by this technique, and highly vulnerable to the slightest change in source format or target data model. This mismatch is at the heart of all problems involving the need for multiple different systems to intercommunicate meaningful information, and makes conventional attempts to mine such information prohibitively expensive to create and maintain. Unfortunately for conventional mining techniques, much of the most valuable information that might be used to create truly intelligent systems comes from publishers of various types. Publishing houses make their money from the information that they aggregate, and thus are not in the least bit interested in making such information available in a form that is susceptible to standard data mining techniques. Furthermore, most publishers deliberately introduce inconsistencies and errors into their data in order both to detect intellectual property rights violations by others, and to make automated extraction as difficult as possible. Each publisher, and indeed each title from any given publisher, uses different formats, and has an arrangement that is custom tailored to the needs of whatever the publication is. The result is that we are faced with a variety of source formats on CD-ROMs, databases, web sites, and other legacy systems that completely stymie standard techniques for acquisition and integration. Very few truly useful sources are available in a nice neat tagged form such as XML and thus to rely on markup languages such as XML to aid in data extraction is a woefully inadequate approach in real-world situations.

One of the basic problems that makes the extraction process difficult is that the control-flow based program that is doing the extraction has no connection to the data itself (which is simply input) and must therefore invest huge amounts of effort extracting and keeping track of its 'state' in order to know what it should do with information at any given time. What is needed, then, is a system in which the content of the data itself actually determines the order of execution of statements in the mining language and automatically keeps track of the current state. In such a system, whenever an action was required of the extraction code, the data would 'tell' it to take that action, and all of the complexity would melt away. Assuming such a system is further tied to a target system ontology, the mining problem would become quite simple. Ideally, such a solution would tie the mining process to compiler theory, since that is most powerful formalized framework available for mapping source textual content into defined actions and state in a rigorous and extensible manner. It would also be desirable to have an interpreted language that is tied to the target ontology (totally different from the source format), and for which the order of statement execution could be driven by source data content.

SUMMARY OF INVENTION

The system of this invention takes the data mining process to a whole new level of power and versatility by recognizing that, at the core of our past failings in this area, lies the fact that conventional control-flow based programming languages are simply not suited to the desired system, and must be replaced at the fundamental level with a more flexible approach to software system generation. There are two important characteristics of the present invention that help create this paradigm shift. The first is that, in the preferred embodiment, the system of the present invention includes a system ontology such that the types and fields of the ontology can be directly manipulated and assigned within the language without the need for explicit declarations. For example, to assign a value to a field called "notes.sourceNotes=" of a type, the present invention would only require the statement "notes.sourceNotes=". An ontology is an explicit formal specification of how to represent the objects, concepts and other entities that are assumed to exist in some area of interest and the relationships that hold among them. The second, and one of the most fundamental characteristics, is that the present invention gives up on the idea of a control-flow based programming language (i.e., one where the order of execution of statements is determined by the order of those statements within the program) in order to dramatically simplify the extraction of data from a source. In other words, the present invention represents a radical departure from all existing "control" notions in programming.

The present invention, hereinafter referred to as MitoMine, is a generic data extraction capability that produces a strongly-typed ontology defined collection referencing (and cross referencing) all extracted records. The input to the mining process tends to be some form of text file delimited into a set of possibly dissimilar records. MitoMine contains parser routines and post processing functions, known as 'munchers'.

The parser routines can be accessed either via a batch mining process or as part of a running server process connected to a live source. Munchers can be registered on a per data-source basis in order to process the records produced, possibly writing them to an external database and/or a set of servers. The present invention embeds an interpreted ontology based language within a compiler/interpreter (for the source format) such that the statements of the embedded language are executed as a result of the source compiler 'recognizing' a given construct within the source and extracting the corresponding source content. In this way, the execution of the statements in the embedded program will occur in a sequence that is dictated wholly by the source content. This system and method therefore make it possible to bulk extract free-form data from such sources as CD-ROMs, the web etc. and have the resultant structured data loaded into an ontology based system.

In the preferred embodiment, a MitoMine parser is defined using three basic types of information:

1) A named source-specific lexical analyzer specification
2) A named Backus-Naur form (BNF) specification for parsing the source
3) A set of predefined plug-in functions capable of interpreting the source information via C** statements.

Other improvements and extensions to this system will be defined herein.

BRIEF DESCRIPTION OF THE FIGURES

[NONE]

DETAILED DESCRIPTION OF THE PREFERRED EMBODIMENT

The present invention is built upon this and, in the preferred embodiment, uses a number of other key technologies and concepts. For example, these following patent applications (which are expressly incorporated herein) disclose all the components necessary to build up a system capable of auto-generating all user interface, storage tables, and querying behaviors required in order to create a system directly from the specifications given in an ontology description language (ODL). These various building-block technologies have been previously described in the following patent applications:

1) Appendix 1—Memory Patent (page 55) now U.S Pat. No. 7,103,749 issued on Sep. 05, 2006.
2) Appendix 2—Lexical Patent (page 68) now U.S Pat. No. 7,328,430 issued on Feb. 05, 2008.
3) Appendix 3—Parser Patent (page 89) now U.S Pat. No. 7,210,130 issued on Apr. 24, 2007.
4) Appendix 4—Types Patent (page 112) now U.S Pat. No. 7,158,984 issued on Jan. 02, 2007.
5) Appendix 5—Collections Patent (page 140) now U.S Pat. No. 7,308,449issued on Dec. 11, 2007.
6) Appendix 6—Ontology Patent (page 199) now U.S Pat. No. 7,240,330 issued on Jul. 03, 2007.

In the Parser Patent, a system was described that permits execution of the statements in the embedded program in a sequence that is dictated wholly by the source content, in that the 'reverse polish' operators within that system are executed as the source parse reaches an appropriate state and, as further described in that patent, these operators are passed a plug-in hint string when invoked. In the preferred embodiment, the plug-in hint string will be the source for the interpreted ontology-based language and the plug-ins themselves will invoke an inner level parser in order to execute these statements. The Ontology Patent introduced an ontology based language that is an extension of the C language known as C*. This is the preferred ontology based language for the present invention. We will refer to the embedded form of this language as C**, the extra '*' symbol being intended to imply the additional level of indirection created by embedding the language within a source format interpreter. The output of a mining process will be a set of ontology defined types (see Types Patent) within a flat data-model collection (see Memory Patent and Collection Patent) suitable for instantiation to persistent storage and subsequent query and access via the ontology (see patent reference 6).

In the preferred embodiment, a MitoMine parser is defined using three basic types of information:

1) A named source-specific lexical analyzer specification
2) A named BNF specification for parsing the source
3) A set of predefined plug-in functions capable of interpreting the source information via C** statements.

The BNF format may be based upon any number of different BNF specifications. MitoMine provides the following additional built-in parser plug-ins which greatly facilitate the process of extracting unstructured data into run-time type manager records:

```
<@1:1>
<@1:2>
```

These two plug-ins delimit the start and end of an arbitrary possibly multi-lined string to be assigned to the field designated by the following call to <@1:5:fieldPath=$>. This is the method used to extract large arbitrary text fields. The token sequence for these plug-ins is always of the form <@1:1><1:String><@1:2>, that is any text occurring after the appearance of the <@1:1> plug-in on the top of the parsing stack will be converted into a single string token (token # 1) which will be assigned on the next <@1:5> plug-in. The arbitrary text will be terminated by the occurrence of any terminal in the language (defined in the .LEX specification) whose value is above 128. Thus the following snippet of BNF will cause the field 'pubName' to be assigned whatever text occurs between the token <PUBLICATION> and <VOLUME/ISSUE> in the input file:

```
<PUBLICATION> <@1:1> <1:String> <@1:2> <@1:5:pubName = $>
<VOLUME/ISSUE> <3:DecInt> <@1:5:volume = $>
```

In the preferred embodiment, when extracting these arbitrary text fields, all trailing and leading white space is removed from the string before assignment, and all occurrences of LINE_FEED are removed to yield a valid text string. The fact that tokens below 128 will not terminate the arbitrary text sequence is important in certain situations where a particular string is a terminal in the language and yet might also occur within such a text sequence where it should not be considered to have any special significance. All such tokens can be assigned token numbers below 128 in the .LEX specification thus ensuring that no confusion arises. The occurrence of another <@1:1> or a <@1:4> plug-in causes any previous <1:String> text accumulated to be discarded. A <@1:5> causes execution of a C** statements that generally cause extracted information to be assigned to the specified field and then clears the record of the accumulation. If a plug-in hint consisting of a decimal number follows the <@1:1> as in <@1:1:4> that number specifies the maximum number of lines of input that will be consumed by the plug-in (four in this example). This is a useful means to handle input where the line number or count is significant.

<@1:3>

In the preferred embodiment, the occurrence of this plug-in indicates that the extraction of a particular record initiated by the <@1:4> plug-in is complete and should be added to the collection of records extracted.

<@1:4:typeName>

In the preferred embodiment, the occurrence of the plug-in above indicates that the extraction of a new record of the type specified by the 'typeName' string is to begin. The "typename" will preferably match a known type manager type either defined elsewhere or within the additional type definitions supplied as part of the parser specification.

<@1:5:C** assignment(s)>

In the preferred embodiment, the plug-in above is used to assign values to either a field or a register. Within the assigned expression, the previously extracted field value may be referred to as '$'. Fields may be expressed as a path to subfields of the structure to any depth using normal type manager path notation (same as for C). As an example, the field specifier "description[$aa].u.equip.specifications" refers to a field within the parent structure that is within an array of unions. The symbol '$aa' is a register designator. There are 26*26 registers '$aa' to '$zz' which may be used to hold the results of calculations necessary to compute field values. A single character register designator may also be used instead thus '$a' is the same as '$aa', '$b' is the same as '$ba' etc. Register names may optionally be followed by a text string (no spaces) in order to improve readability (as in $aa:myIndex) but this text string is ignored by the C** interpreter. The use of registers to store extracted information and context is key to handling the distributed nature of information in published sources. In the example above, '$a' is being used as an index into the array of 'description' fields. To increment this index a "<@1:5:$a=$a+1>" plug-in call would be inserted in the appropriate part of the BNF (presumably after extraction of an entire 'description' element). All registers are initially set to zero (integer) when the parse begins, thereafter their value is entirely determined by the <@1:5> plug-ins that occur during the extraction process. If a register is assigned a real or string value, it adopts that type automatically until a value of another type is assigned to it. Expressions may include calls to functions (of the form $FuncName), which provide a convenient means of processing the inputs extracted into certain data types for assignment. These functions provide capabilities comparable to the string processing libraries commonly found with older generation data mining capabilities.

When assigning values to fields, the <@1:5> plug-in performs intelligent type conversions, for example:

1) If the token is a <1:String> and the field is a 'charHdl', a handle is created and assigned to the field. Similarly for a 'charPtr'. If the field is a fixed length character array, the string is copied into it. If it won't fit, a bounds error is flagged. If the field is already non-empty (regardless of type) then the <@1:5> plugin appends any new text to the end of the field value (if possible). Note that registers do not append automatically unless you use the syntax $a=$a+"string".

2) If the field is numeric, appropriate type conversions from the extracted value occur. Range checking could be automatic. Multiple assignments may be separated by semi-colons. The full syntax supported within the 'assignment' string is defined by the system BNF language "MitoMine" (described below).

Note that because the order of commutative operator (e.g., "+") evaluation is guaranteed to be left-to-right, multiple non-parenthesized string concatenation operations can be safely expressed as a single statement as in:

fieldname="Hello"+$FirstCapOnly($a)+"do you like"+$b+"\n"

The <@1:5> plug-in may also be used to support limited conditional statements which may be performed using the 'if' and 'ifelse' keywords. The effect of the 'if' is to conditionally skip the next element of the production that immediately follows the <@1:5> containing the 'if' (there can be only one statement within an 'if' or 'ifelse' block). For example:

<@1:5:if(1 == 0)> <@1:4:typeName>
would cause the <@1:4> plug-in to be discarded without interpretation. Similarly:
<@1:5:ifelse(1 == 0)> <@1:4:typeName1> <@1:4:typeName2>
causes execution of the second of the two <@1:4> plug-ins while:
<@1:5:ifelse(0 == 0)> <@1:5:$a = $a + 1; $b = 1> <@1:5:$a = $a − 1; $b = 0>
causes execution of the first block to increment $a and assign $b to 1.

More significantly, since it is possible to discard any element from the production in this manner, the prudent use of conditional <@1:5> evaluation can be used to modify the recognized syntax of the language. Consider the following production:

myProduction ::=<@1:5:ifelse ($a>=0)>positive_ prod negative_prod

In this example, the contents of register '$a' is determining which of two possible productions will get evaluated next. This can be a very powerful tool for solving non-context-free language ambiguities (normally intractable to this kind of parser) by remembering the context in one of the registers and then resolving the problem later when it occurs. The results of misusing this capability can be very confusing and the reader is referred to the incorporated materials of the Parser Patent for additional details. That having been said, the following simplified guidelines should help to ensure correctness:

For any production of the form:
    prod    ::= <@1:5:ifelse (expression)> theClause elseClause
Ensure:
    1) FIRST(thenClause) == FIRST(elseClause)
    2) Either both thenClause and elseClause are NULLABLE, or neither is
    3) If elseClause is not NULLABLE, and if necessary (depending on other occurrences of thenClause),
    include a production elsewhere {that may never be executed} to ensure that FOLLOW(thenClause) includes FOLLOW(elseClause)
For any production of the form:
    prod    ::= prevElement <@1:5:if (expression)> thenClause nextElement
Ensure that if thenClause is not NULLABLE, and if necessary (depending on other occurrences of nextElement), include a production elsewhere {that may never be executed} to ensure that FIRST(nextElement) is entirely contained within FOLLOW(prevElement).

Ensure that if then Clause is not NULLABLE, and if necessary (depending on other occurrences of nextElement), include a production elsewhere {that may never be executed} to ensure that First(nextElement) is entirely contained within Follow(preElement).

Note that all plug-ins may contain multiple lines of text by use of the <cont> symbol (see Parser patent). This may be required in the case where a <@1:5> statement exceeds the space available on a single line (e.g., many parameters to a function). The maximum size of any given plug-in text in the preferred embodiment is 8 KB.

The present invention also permits the specification of the language specific parser to include any user dialogs and warnings that might be required for the parser concerned, any additional type definitions that might be required as part of parser operation, and any custom annotations and scripts (see Collections Patent) that might be necessary.

Within the <@1:5> plug-in, in addition to supporting conditionals, additive, multiplicative and assignment operators, this package preferably provides a number of built-in functions that may be useful in manipulating extracted values in order to convert them to a form suitable for assignment to typed fields. These functions are loosely equivalent to the string processing library of conventional mining languages. Function handlers may be registered (via a registry API—see Parser Patent for further details) to provide additional built in functions. In the built-in function descriptions below, for example, the type of a given parameter is indicated between square brackets. The meaning of these symbols in this example is as follows:

[I]—Integer value (64 bit)
[F]—Floating point value (double)
[S]—String value

The following is a partial list of predefined built-in functions that have been found to be useful in different data mining situations. New functions may be added to this list and it is expected that use of the system will often include the step of adding new functions. In such a case, if a feature is not provided, it can be implemented and registered as part of any particular parser definition. On the other hand, none of the features listed below are required meaning that a much smaller set of functions could also be used. In the preferred embodiment, however, the following functions (or ones having similar functionality) would be available.

1) [F] $Date( )
   get current date/time into a date-double
2) [F] $StringToDate([S] dateString,[S] calendar)
   convert "dateString" to date/time double, current date if date string format invalid. The currently supported calendar values are "G"—Gregorian, "J"—Julian etc. Note that in the Gregorian calendar you may specify the date string in a wide variety of formats, in any other calendar it must be in the following format: "yyyy:mm:dd [hh:mm[:ss] [AM/PM]]"
3) [S] $TextAfter([S] srcStr,[S] delimStr)
   Return the string portion after the specified delimiter sequence. Returns " " if not found.
4) [S] $TextBefore([S] srcStr,[S] delimStr)
   Return the string portion before the specified delimiter sequence. Returns " " if not found.
5) [S] $TextBetween([S] srcStr,[S] startStr,[S] endStr)
   Return the string portion between the specified delimiter sequences. Returns " " if not found.
6) [I] $Integer([S] aString)
   Convert the specified string to an integer (decimal or hex)
7) [F] $Real([S] aString)
   Convert the specified string to a real number
8) [I] $IntegerWithin([S] aString[I] n)
   Extract the n'th integer (decimal or hex, n=1 . . . ) within the specified arbitrary string
9) [F] $RealWithin([S] aString[I] n)
   Extract the n'th real (n=1 . . . ) within the specified arbitrary string
10) [S] $StripMarkup([S] aString)
    Strip any Markup language tags out of a string to yield plain text.
11) [S] $SourceName( )
    Inserts the current value of 'languageName'
12) [S] $SetPersRefInfo([S] aString)
    This function allows you to append to the contents of the 'stringH' field of a persistent reference field rather than assigning to the name. The function result is equal to 'aString' but the next assignment made by the parser will be to the 'stringH' sub-field, not the 'name' sub-field.
13) [S] $FirstCapOnly([S] aString)
    Converts a series of words in upper/lower case such that each word starts with an upper case character and all subsequent characters are lower case.
14) [S] $TextNotAfter([S] srcStr,[S] delimStr)
    Similar in operation to $TextBefore( ) except if 'delimStr' is not found, the original string is returned un-altered.
15) [S] $TextNotBefore([S] srcStr,[S] delimStr)
    Similar in operation to $TextAfter( ) except if 'delimStr' is not found, the original string is returned un-altered.
16) [S] $TextNotBetween([S] srcStr,[S] startStr,[S] endStr)
    Returns what remains after removing the string portion between the specified delimiter sequences (and the delimiter sequences themselves). If the sequence is not found, the original string is returned un-altered.
17) [S] $TruncateText([S] srcStr,[I] numChars)
    Truncated the source string to the specified number of characters.
18) [S] $TextBeforeNumber([S] srcStr)
    This function is similar in operation to $TextBefore( ) but the 'delimStr' is taken to be the first numeric digit encountered.
19) [S] $TextWithout([S] srcStr,[S] sequence)
    This function removes all occurrences of the specified sequence from the source string.
20) [S] $WordNumber([S] srcStr,[I] number)
    This function gets the specified word (starting from 1) from the source string. If 'number' is negative, the function counts backward from the last word in the source string.
21) [S] $Ask([S] promptStr)
    This function prompts the user using the specified string and allows him to enter a textual response which is returned as the function result.
22) [S] $TextWithoutBlock([S] srcStr,[S] startDelim,[S] endDelim)
    This function removes all occurrences of the delimited text block (including delimiters) from the source string.
23) [S] $ReplaceSequence([S] srcStr,[S] sequence,[S] nuSequence)
    This function replaces all occurrences of the target sequence by the sequence 'nuSequence' within the given string.
24) [S] $AppendIfNotPresent([S] srcStr,[S] endDelim)
    This function determines if 'srcStr' ends in 'endDelim' and if not appends 'endDelim' to 'srcStr' returning the result.
25) [S] $ProperNameFilter([S] srcStr,[I] wordMax,[S] delim)
    This function performs the following processing (in order) designed to facilitate the removal of extraneous strings of text from 'delim' separated lists of proper names (i.e., capitalized first letter words):
    a) if the first non-white character in a 'delim' bounded block is not upper case, remove the entire string up to and including the trailing occurrence of 'delim' (or end of string).
    b) for any 'delim' bounded block, strip off all trailing words that start with lower case letters.

c) if more than 'wordMax' words beginning with a lower case letter occur consecutively between two occurrences of 'delim', terminate the block at the point where the consecutive words occur.

26) [S] $Sprintf([S] formatStr, . . . )

This function performs a C language sprintf( ) function, returning the generated string as its result.

27) [S] $ShiftChars([S] srcStr,[I] delta)

This function shifts the character encoding of all elements of 'srcStr' by the amount designated in 'delta' returning the shifted string as a result. This functionality can be useful for example when converting between upper and lower case.

28) [S] $FlipChars([S] srcStr)

This function reverses the order of all characters in 'srcStr'.

29) [S] $ReplaceBlockDelims([S] srcStr,[S] startDelim, [S] endDelim,[S] nuStartDelim, [S] nuEndDelim,[I] occurrence, [I] reverse)

This function replaces the start and end delimiters of one or more delimited blocks of text by the new delimiters specified. If 'occurrence' is zero, all blocks found are processed, otherwise just the block specified (starting from 1). If 'reverse' is non-zero (i.e., 1), this function first locates the ending delimiter and then works backwards looking for the start delimiter. Often if the start delimiter is something common like a space character (e.g., looking for the last word of a sentence), the results of this may be quite different from those obtained using 'reverse'=0.

30) [S] $RemoveIfFollows([S] srcStr,[S] endDelim)

This function determines if 'srcStr' ends in 'endDelim' and if so removes 'endDelim' from 'srcStr' returning the result.

31) [S] $RemoveIfStarts([S] srcStr,[S] startDelim)

This function determines if 'srcStr' starts with 'startDelim' and if so removes 'startDelim' from 'srcStr' returning the result.

32) [S] $PrependIfNotPresent([S] srcStr,[S] startDelim)

This function determines if 'srcStr' starts with 'startDelim' and if not prepends 'startDelim' to 'srcStr' returning the result.

33) [S] $NoLowerCaseWords([S] srcStr)

This function eliminates all words beginning with lower case letters from 'srcStr' returning the result.

34) [S] $ReplaceBlocks([S] srcStr,[S] startDelim,[S] endDelim,[I] occurrence,[S] nuSequence)

This function replaces one or all blocks delimited by the specified delimiter sequences with the replacement sequence specified. If 'occurrence' is zero, all blocks are replaced, otherwise the occurrence is a one-based index to the block to replace.

35) [S] $AppendIfNotFollows([S] srcStr,[S] endDelim)

This function determines if 'srcStr' ends in 'endDelim' and if not appends 'endDelim' to 'srcStr' returning the result.

36) [I] $WordCount([S] srcStr)

This function counts the number of words in the source string, returning the numeric result.

37) [S] $PreserveParagraphs([S] srcStr)

This function eliminates all line termination characters (replacing them by spaces) in the source string other than those that represent paragraph breaks. Source text has often been formatted to fit into a fixed page width (e.g., 80 characters) and since we wish the captured text to re-size to fit whatever display area is used, it is often necessary to eliminate the explicit line formatting from large chunks of text using this function. A paragraph is identified by a line termination immediately followed by a tab or space character (also works with spaces for right justified scripts), all other explicit line formatting is eliminated. The resulting string is returned.

38) [I] $StringSetIndex([S] srcStr,[I] ignoreCase,[S] setStr1 . . . [S] setStrN)

This function compares 'srcStr' to each of the elements in the set of possible match strings supplied, returning the index (starting from 1) of the match string found, or zero if no match is found. If 'ignoreCase' is non-zero, the comparisons are case insensitive, otherwise they are exact.

39) [S] $IndexStringSet([I] index,[S] setStr1 . . . [S] setStrN)

This function selects a specific string from a given set of strings by index (1-based), returning as a result the selected string. If the index specified is out of range, an empty string is returned.

40) [S] $ReplaceChars([S] srcStr,[S] char,[S] nuChar)

This function replaces all occurrences of 'char' in the string by 'nuChar' returning the modified string as a result.

41) [S] $Sentence([S] srcStr,[I] index)

This function extracts the designated sentence (indexing starts from 0) from the string, returning as a result the sentence. If the index specified is negative, the index counts backwards from the end (i.e., −1 is the last sentence etc.). A sentence is identified by any sequence of text terminated by a period.

42) [S] $FindHyperlink([S] srcStr,[S] domain, [I] index)

This function will extract the index'th hyperlink in the hyperlink domain specified by 'domain' that exists in 'srcStr' (if any) and return as a result the extracted hyperlink name. This technique can be used to recognize known things (e.g., city or people names) in an arbitrary block of text. If no matching hyperlink is found, the function result will be an empty string.

43) [S] $AssignRefType([S] aString)

This function allows you to assign directly to the typeID sub-field of a persistent reference field rather than assigning to the name. The function result is equal to 'aString' but the next assignment made by the parser will be to the typeID sub-field 'aString' is assumed to be a valid type name), not the 'name' sub-field.

44) [I] $RecordCount( )

This function returns the number of records created so far during the current mining process.

45) [S] $Exit([S] aReason)

Calling this function causes the current parsing run to exit cleanly, possibly displaying a reason for the exit (to the console) as specified in the 'aReason' string (NULL if no reason given).

46) [I] $MaxRecords( )

This function returns the maximum number of records to be extracted for this run. This value can either be set by calling $SetMaxRecords( ) or it may be set by external code calling MN_SetMaxRecords( ).

47) [I] $SetMaxRecords([I] max)

This function sets the maximum number of records to be extracted for this run. See $MaxRecords( ) for details.

48) [I] $FieldSize([S] fieldName)

This function returns the size in bytes of the field specified in the currently active type record as set by the preceding <@1:4:typeName> operator. Remember that variable sized string fields (i.e., char @fieldName) and similar will return a size of size of (Ptr), not the size of the string within it.

49) [I] $TextContains([S] srcText,[S] subString)
This function returns 0 if the 'srcText' does not contain 'subString', otherwise it returns the character index within 'srcText' where 'subString' starts+1.

50) [I] $ZapRegisters([S] minReg,[S] maxReg)
This function empties the contents of all registers starting from 'minReg' and ending on 'maxReg'. The parameters are simply the string equivalent of the register name (e.g., "$aa"). When processing multiple records, the use of $ZapRegisters( ) is often more convenient than explicit register assignments to ensure that all the desired registers start out empty as record processing begins. The result is the count of the number of non-empty registers that were zapped.

51) [I] $CRCString([S] srcText)
This function performs a 32-bit CRC similar to ANSI X3.66 on the text string supplied, returning the integer CRC result. This is can be useful when you want to turn an arbitrary (i.e., non-alphanumeric) string into a form that is (probably!) unique for name generating or discriminating purposes.

Note that parameters to routines may be either constants (of integer, real or string type), field specifiers referring to fields within the current record being extracted, registers, $ (the currently extracted field value), or evaluated expressions which may include embedded calls to other functions (built-in or otherwise). This essentially creates a complete programming language for the extraction of data into typed structures and collections. The C** programming language provided by the <@1:5> plug-ins differs from a conventional programming language in that the order of execution of the statements is determined by the BNF for the language and the contents of the data file being parsed. In the preferred embodiment, the MitoMine parser is capable of recognizing and evaluating the following token types:

3—DecInt—syntax as for a C strtoul( ) call but ignores embedded commas.
   4—Real—real—as for C strtod( )
   5—Real—real scientific format—as for C strtod( )

The plug-in 5 MitoMine parser, in addition to recognizing registers, $, $function names, and type field specifications, can also preferably recognize and assign the following token types:

2—character constant (as for C)
   7—Hex integer (C format)
   3—decimal integer (as for C strtoul)
   10—octal integer (as for strtoul)
   4—real (as for strtod)
   5—real with exponent (as for strtod)
   12—string constant (as for C)

Character constants can be a maximum of 8 characters long, during input, they are not sign extended. The following custom parser options would preferably be supported:

kTraceAssignments (0x00010000)—Produces a trace of all <@1:5> assignments on the console kpLineTrace (0x00020000)—Produces a line trace on the console
   kTraceTokens (0x00040000)—Produces a trace of each token recognized These options may be specified for a given parser language by adding the corresponding hex value to the parser options line. For example, the specification below would set kTraceAssignments+kpLineTrace options in addition to those supported by the basic parse package:

=0x30000+kPreserveBNFsymbols+kBeGreedyParser

The lexical analyzer options line can also be used to specify additional white-space and delimiter characters to the lexical analyzer as a comma separated list. For example the specification below would cause the characters 'a' and 'b' to be treated as whitespace (see LX_AddWhiteSpace) and the characters 'Y' and 'Z' to be treated as delimiters (see LX_AddDelimiter).

=kNoCaseStates+whitespace(a,b)+delimiter(Y,Z)

Appendix A (page 28) provides a sample of the BNF and LEX specifications that define the syntax of the <@1:5> plug-in (i.e., C) within MitoMine (see Parser Patent for further details). Note that most of the functionality of C is already provided by the predefined plug-in functions (plug-in 0) supplied by the basic parser package. A sample implementation of the <@1:5> plug-in one and a sample implementation of a corresponding resolver function are also provided.

As described previously, the lexical and BNF specifications for the outermost parser vary depending on the source being processed (example given below), however the outer parser also has a single standard plug-in and resolver. A sample implementation of the standard plug-in one and a sample implementation of a corresponding resolver function are also provided in Appendix A.

The listing below gives the API interface to the MitoMine capability for the preferred embodiment although other forms are obviously possible. Appendix A provides the sample pseudo code for the API interface.

In the preferred embodiment, a function, hereinafter called MN_MakeParser( ), initializes an instance of the MitoMine and returns a handle to the parser database which is required by all subsequent calls. A 'parserType' parameter could be provided to select a particular parsing language to be loaded (see PS_LoadBNF) and used.

In the preferred embodiment, a function, hereinafter called MN_SetRecordAdder( ) determines how (or if) records once parsed are added to the collection. The default record adder creates a set of named lists where each list is named after the record type it contains.

In the preferred embodiment, a function, hereinafter called MN_SetMineFunc( ), sets the custom mine function handler for a MitoMine parser. Additional functions could also be defined over and above those provided by MitoMine within the <@1:5: . . . > plugin context. A sample mine function handler follows:

```
static Boolean myFunc      (                    // custom function handler
           ET_ParseHdl        aParseDB,         //IO:handle to parser DB
           int32              aContextID        //I:context
                             )                  // R:TRUE for success
{
    p = (myContextPtr)aContextID;               // get our context pointer
    opCount = PS_GetOpCount(aParseDB,TOP);      // get # of operands
    tokp = PS_GetToken(aParseDB,opCount);       // get fn name
    for ( i = 0 ; i < opCount ; i++ )
```

```
        if ( !PS__EvalIdent(aParseDB,i) )              // eval all elements on stack
        {
            res = NO;
            goto BadExit;
        }
    if ( !US__strcmp(tokp,"$myFuncName") )             // function name
    {
        -- check operand count and type
        -- implement function
        -- set resulting value into stack 'opCount' e.g.:
                PS__SetiValue(aParseDB,opCount,result);
    } else if ( !US__strcmp(tokp,"$another function") )
```

In the preferred embodiment, a function, hereinafter called MN_SetMaxRecords( ), sets the maximum number of records to be mined for a MitoMine parser. This is the number returned by the built-in function $GetMaxRecords( ). If the maximum number of records is not set (i.e., is zero), all records are mined until the input file(s) is exhausted.

In the preferred embodiment, a function, hereinafter called MN_SetMineLineFn( ), sets the MitoMine line processing function for a given MitoMine parser. A typical line processing function might appear as follows:

```
static void myLineFn    (                           // Built-in debugging mine-line fn
            ET__ParseHdl    aParseDB,               // I:Parser DB
            int32           aContextID,             // I:Context
            int32           lineNum,                // I:Current line number
            charPtr         lineBuff,               // IO:Current line buffer
            charPtr         aMineLineParam          // I:String parameter to function
                        )                           // R:void
```

These functions can be used to perform all kinds of different useful functions such as altering the input stream before the parser sees it, adjusting parser debugging settings, etc. The 'aMineLineParam' parameter above is an arbitrary string and can be formatted any way you wish in order to transfer the necessary information to the line processing function. The current value of this parameter is set using MN_SetMineLineParam( ).

In the preferred embodiment, a function, hereinafter called MN_SetMineLineParam( ), sets the string parameter to a MitoMine line processing function.

In the preferred embodiment, two functions, hereinafter called MN_SetParseTypeDB( ) and MN_GetParseTypeDB( ), can be used to associate a type DB (probably obtained using MN_GetMineLanguageTypeDB) with a MitoMine parser. This is preferable so that the plug-ins associated with the extraction process can determine type information for the structures unique to the language. In the preferred embodiment, the function MN_GetParseTypeDB( ) would return the current setting of the parser type DB.

In the preferred embodiment, a function, hereinafter called MN_SetFilePath( ), sets the current file path associated with a MitoMine parser.

In the preferred embodiment, a function, hereinafter called MN_GetFilePath( ), gets the current file path associated with a MitoMine parser.

In the preferred embodiment, a function, hereinafter called MN_SetCustomContext( ), may be used to get the custom context value associated with a given MitoMine parser. Because MitoMine itself uses the parser context (see PS_SetContextID), it provides this alternative API to allow custom context to be associated with a parser.

In the preferred embodiment, a function, hereinafter called MN_GetCustomContext( ), may be used to get the custom context value associated with a given MitoMine parser. Because MitoMine itself uses the parser context (see PS_SetContextID), it provides this alternative API to allow custom context to be associated with a parser.

In the preferred embodiment, a function, hereinafter called MN GetParseCollection( ), returns the collection object associated with a parser. MN_SetParseCollection( ) allows this value to be altered. By calling MN_SetParseCollection( . . . , NULL) it is possible to detach a collection from the parser in cases where you wish the collection to survive the parser teardown process.

In the preferred embodiment, a function, hereinafter called MN_SetParseCollection( ), returns the collection object associated with a parser. MN_SetParseCollection( ) allows this value to be altered. By calling MN_SetParseCollection( . . . , NULL) it is possible to detach a collection from the parser. This would be useful in cases where it is preferable to permit the collection to survive the parser teardown process.

In the preferred embodiment, a function, hereinafter called MN_GetMineLanguageTypeDB( ), returns a typeDB handle to the type DB describing the structures utilized by the specified mine language. If the specified typeDB already exists, it is simply returned, otherwise a new type DB is created by loading the type definitions from the designated MitoMine type specification file.

In the preferred embodiment, a function, hereinafter called MN_KillParser( ), disposes of the Parser database created by MN_MakeParser( ). A matching call to MN_KillParser( ) must exist for every call to MN_MakeParser( ). This call would also invoke MN_CleanupRecords( ) for the associated collection.

In the preferred embodiment, a function, hereinafter called MN_Parser( ), invokes the MitoMine parser to process the designated file. The function is passed a parser database created by a call to MN_MakeParser( ). When all calls to MN_Parse( ) are complete, the parser database must be disposed using MN_KillParser( ).

In the preferred embodiment, a function, hereinafter called MN_RunMitoMine( ), creates the selected MitoMine parser on the contents of a string handle. An parameter could also be passed to the MN_MakeParser( ) call and can thus be used to specify various debugging options.

In the preferred embodiment, a function, hereinafter called MN_CleanupRecords( ), cleans up all memory associated with the set of data records created by a call to MN_RunMitoMine( ).

In the preferred embodiment, a function, hereinafter called MN_RegisterMineMuncher( ), can be used to register by name a function to be invoked to post process the set of records created after a successful MitoMine run. The name of the registered Muncher function would preferably match that of the mining language (see MN_Parse for details). A typical mine-muncher function might appear as follows:

```
static ET_CollectionHdl myMuncher(        // My Mine Muncher function
        ET_MineScanRecPtr   scanP,        // IO:Scanning context record
        ET_CollectionHdl    theRecords,   // I:Collection of parsed records
        char                typeDBcode,   // I:The typeDB code
        charPtr             parserType,   // I:The parser type/language name
        ET_Offset           root,         // I:Root element designator
        charPtr             customString  // I:Avail pass cstm strig to muncher
        )                                 // R:The final collection
```

The 'scanP' parameter is the same 'scanP' passed to the file filter function and can thus be used to communicate between file filters and the muncher or alternatively to clean up any leftovers from the file filters within the 'muncher'. Custom 'muncher' functions can be used to perform a wide variety of complex tasks, indeed the MitoMine approach has been used successfully to extract binary (non-textual) information from very complex sources, such as encoded database files, by using this technique.

In the preferred embodiment, a function, hereinafter called MN_DeRegisterMineMuncher( ), de-registers a previously registered mine muncher function.

In the preferred embodiment, a function, hereinafter called MN_InvokeMineMuncher( ), invokes the registered 'muncher' function for the records output by a run of Mito-Mine (see MN_RunMitoMine). If no function is registered, the records and all associated memory are simply disposed using MN_CleanupRecords( ).

In the preferred embodiment, a function, hereinafter called MN_RegisterFileFilter( ), can be used to register by name a file filter function to be invoked to process files during a MitoMine run. If no file filter is registered, files are treated as straight text files, otherwise the file must be loaded and pre/post processed by the file filter. A typical file filter function might appear as follows:

```
static EngErr myFileFilter (              // Scan files and mine if appropr
        HFileInfo         *aCatalogRec,   // IO:The catalog search record
        int32Ptr          flags,          // IO:available for flag use
        ET_MineScanRecPtr scanP           // IO:Scanning context record
        )                                 // R:zero for success, else error #
```

In the preferred embodiment, a function, hereinafter called MN_ListFileFilters( ), obtains a string list of all know Mito-Mine file filter functions.

In order to illustrate how MitoMine is used to extract information from a given source and map it into its ontological equivalent, we will use the example of the ontological definition of the Country record pulled from the CIA World Fact book. The extract provided in Appendix B (page 45) is a portion of the first record of data for the country Afghanistan taken from the 1998 edition of this CD-ROM. The format of the information in this case appears to be a variant of SGML, but it is clear that this approach applies equally to almost any input format. The lexical analyzer and BNF specification for the parser to extract this source into a sample ontology are also provided in Appendix B. The BNF necessary to extract country information into a sample ontology is one of the most complex scripts thus far encountered in MitoMine applications due to the large amount of information that is being extracted from this source and preserved in the ontology.

Because this script is so complex, it probably best illustrates a less than ideal data-mining scenario but also demonstrates use of a large number of different built-in mining functions. Some of the results of running the extraction script below can be seen in the Ontology patent relating to auto-generated UI.

Note that in the BNF provided in Appendix B, a number of distinct ontological items are created, not just a country. The BNF starts out by creating a "Publication" record that identifies the source of the data ingested; it also creates a "Government" record, which is descended from Organization. The Government record is associated with the country and forms the top level of the description of the government/organization of that country (of which the military branches created later are a part). In addition, other records could be created and associated with the country, for example the "opt_figure" production is assigning a variety of information to the 'stringH' field of the "mapImage" field that describes a persistent reference to the file that contains the map image. When the data produced by this parse is written to persistent storage, this image file is also copied to the image server and through the link created, can be recalled and displayed whenever the country is displayed (as is further demonstrated in the UI examples of the Ontology Patent). In fact, as a result of extracting a single country record, perhaps 50-100 records of different types are created by this script and associated in some way with the country including government personnel, international organizations, resources, population records, images, cities and ports, neighboring countries, treaties, notes, etc. Thus it is clear that what was flat, un-related information in the source has been converted to richly interconnected, highly computable and usable ontological information after the extraction completes. This same behavior is repeated for all the diverse sources that are mined into any given system and the information from all such sources becomes cross-correlated and therefore infinitely more useful than it was in its separate, isolated form. The power of this approach over conventional data mining technologies is clear.

The foregoing description of the preferred embodiments of the invention has been presented for the purposes of illustration and description. For example, although described with respect to the C* programming language, any programming language that includes the appropriate extensions could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A data mining method in a data processing system comprising a processor and a memory for storing data mined from a variety of sources into a structured target data model, the method comprising the steps of:
   (a) receiving a first source data for mining by the data processing system;
   (b) parsing said first source data by the data processing system; said parsing step further comprising:
      (b1) parsing a source format of said first source data with an outer parser running in the processor;
      (b2) based on said parsed source format, processing selected data extracted from said first source data with an inner level parser embedded in said outer parser; and
      (b3) executing by said inner level parser one or more statements in an order dictated by a content of said first source data as dictated by an evolution of a parsing state of said outer level parser, wherein said one or more statements are expressed using an ontology description language having one or more data types and one or more data fields which are directly manipulated and assigned by said one or more statements executed within said inner level parser through said ontology description language without explicit declarations therein;
   (c) creating, as a result of said parsing steps, a first collection of records conformed to the structured target data model as described by said ontology description language, wherein each of said records in said first collection of records are referenced and cross-referenced to each other;
   (d) storing said first collection of records conformed to the structured target data model in the memory;
   (e) retrieving said first collection of records for further processing by the data processing system.

2. The method according to claim 1 further comprising the steps of:
   receiving a next source data for mining by the data processing system; and
   repeating steps (b) through (d) for said next source data, wherein a next collection of records are referenced and cross-referenced to each other and to said first collection of records.

3. The method according to claim 1, wherein said parsing step further comprises the step of:
   utilizing a named source specific lexical analyzer specification for parsing said first source data.

4. The method according to claim 1, wherein said parsing step further comprises the step of:
   utilizing a named source specific Backus-Naur Form (BNF) specification for parsing said first source data.

5. The method according to claim 4, wherein said utilizing step further comprises the step of:
   utilizing one or more embedded plug-ins specified in said named source specific BNF specification to invoke and supply said one or more statements to said inner level parser.

6. The method according to claim 1 further comprising the step of:
   altering said first data source before said parsing step.

7. The method according to claim 1 further comprising the steps of:
   registering one or more post processing functions; and
   executing said one or more post processing functions on said first collection of records prior to said storing step.

8. The method according to claim 1 further comprising the step of:
   querying said first collection of records stored in the memory for cross-source analysis.

9. The method according to claim 1 further comprising the step of:
   performing said parsing step via a batch mining process.

10. The method according to claim 1 further comprising the step of:
    performing said parsing step as part of a running server process connected to a live source for said first source data.

11. A data processing system for mining data from a variety of sources for storing in a structured target data model, the system comprising:
    a processor;
    an outer parser running in said processor, wherein said outer parser parses a source format of a first source data received by said processor;
    an inner level parser embedded in said outer parser for parsing said first data source based on said parsed source format;
    an ontology description language in which the structured target data model is specified and which is also utilized by said inner level parser, wherein said inner level parser executes one or more statements in an order dictated by a content of said first source data, wherein said one or more statements are expressed in said ontology description language and access one or more data types and one or more data fields that are directly manipulated and assigned within said inner level parser using said ontology description language without explicit declarations therein; and
    a memory for storing a first collection of records created by said outer parser and said inner level parser, wherein said first collection of records conform to the structured target data model, and each of said records in said first collection of records are referenced and cross-referenced to each other, wherein said first collection of records are retrieved from the memory for further processing by the data processing system.

12. The system according to claim 11 further comprising:
a named source specific lexical analyzer specification passed to said outer level parser for use in tokenizing said first source data.

13. The system according to claim 11 further comprising:
a named source specific Backus-Naur Form (BNF) specification passed to said outer level parser for use in parsing said first source data.

14. The system according to claim 13 further comprising:
one or more embedded plug-ins specified in said named source specific BNF specification for invoking and supplying said one or more statements to said inner parser.

15. The system according to claim 14 wherein said named source specific BNF specification further comprises:
a specification for said one or more embedded plug-ins that are passed textual strings consisting of interpretable source statements.

16. The system according to claim 15 wherein said one or more embedded plug-ins pass said one or more statements to said inner parser via said textual strings thereby determining said order of execution of said one or more statements in said inner parser based on a parser state of said outer parser as determined by said contents of said first source data.

17. The system according to claim 11 further comprising:
a line processing function running in said processor, wherein said line processing function permits pre-examination and alteration of lines appearing in said first source data before said first source data is processed by said outer parser.

18. The system according to claim 11 further comprising:
one or more post processing functions, wherein said one or more post processing functions are executed on said first collection of records prior to storing in said memory.

19. The system according to claim 11 further comprising:
a set of assignable and readable registers logically associated with each instance of said inner level parser and said outer parser, wherein said registers are used to store any data assigned to them or to store a current state of said outer parser and said inner level parser, and which may be accessed and manipulated by said one or more statements executed by said inner level parser.

20. The system according to claim 11 further comprising:
an application user interface for invoking the system to mine data from said first data source.

21. The system according to claim 11 further comprising:
a server running a server process, wherein the system can be registered with said running server process connected to said first data source in order to allow said server to mine data from said first data source on a continuous unattended basis.

* * * * *

UNITED STATES PATENT AND TRADEMARK OFFICE
CERTIFICATE OF CORRECTION

PATENT NO.        : 7,533,069 B2                                                   Page 1 of 1
APPLICATION NO.   : 11/455304
DATED             : May 12, 2009
INVENTOR(S)       : John Fairweather It is certified that error appears in the above-identified patent and that said Letters Patent is hereby corrected as shown below:

Column 17,
line 61, Add the word -- and -- after the word "memory;".

Signed and Sealed this

Ninth Day of March, 2010

David J. Kappos
*Director of the United States Patent and Trademark Office*